US012002491B2

(12) United States Patent
Crichton et al.

(10) Patent No.: US 12,002,491 B2
(45) Date of Patent: Jun. 4, 2024

(54) VISUAL EFFECT DESIGN USING MULTIPLE PREVIEW WINDOWS

(71) Applicant: Lemon Inc., Grand Cayman (KY)

(72) Inventors: Maryyann Crichton, Culver City, CA (US); Nite Luo, Los Angeles, CA (US); Xinglun Liang, Beijing (CN); Josiah John Serrano, Culver City, CA (US); Lakshminarayanan Vijayaraghavan, Los Angeles, CA (US); Deepak Ramalingam, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 17/566,342

(22) Filed: Dec. 30, 2021

(65) Prior Publication Data

US 2023/0215465 A1 Jul. 6, 2023

(51) Int. Cl.
| | |
|---|---|
| G06F 3/048 | (2013.01) |
| G06F 9/445 | (2018.01) |
| G06T 19/00 | (2011.01) |
| G11B 27/031 | (2006.01) |

(52) U.S. Cl.
CPC ........ *G11B 27/031* (2013.01); *G06F 9/44505* (2013.01); *G06T 19/006* (2013.01)

(58) Field of Classification Search
CPC .. G11B 27/031; G06F 9/44505; G06T 19/006
See application file for complete search history.

(56) References Cited

U.S. PATENT DOCUMENTS

| | | | | |
|---|---|---|---|---|
| 9,003,299 | B2 * | 4/2015 | Freedman | H01B 7/292 |
| | | | | 715/745 |
| 2007/0035616 | A1 * | 2/2007 | Lee | H04N 1/00424 |
| | | | | 358/527 |
| 2007/0153331 | A1 * | 7/2007 | Ueda | H04N 1/00161 |
| | | | | 358/1.9 |
| 2013/0314443 | A1 | 11/2013 | Grassick | |

(Continued)

FOREIGN PATENT DOCUMENTS

CN 109144384 A 1/2019

OTHER PUBLICATIONS

Conrad Chavez et al. Adobe Photoshop Classroom in a Book (2020 release), Adobe Press, pp. 1-276 "adobe_photoshop.pdf" (Year: 2020).*

(Continued)

*Primary Examiner* — Haoshian Shih
(74) *Attorney, Agent, or Firm* — BakerHostetler

(57) ABSTRACT

The present disclosure describes techniques for designing effects. A first window comprising a first copy of a first scene may be created. The first scene comprises a first visual effect. A second window comprising a second copy of the first scene may be created. The first window and the second window are configured to enable testing and comparison of different versions of the first visual effect in the first scene at an approximately same time. The first copy of the first scene in the first window may be modified based on a first change to at least one attribute of the first visual effect in the first copy of the first scene. The second copy of the first scene in the second window may be modified based on a second change to at least one attribute of the first visual effect in the second copy of the first scene.

20 Claims, 10 Drawing Sheets

(56) References Cited

U.S. PATENT DOCUMENTS

| | | | |
|---|---|---|---|
| 2013/0332857 A1* | 12/2013 | Kim | H04N 1/387 |
| | | | 715/753 |
| 2019/0266660 A1* | 8/2019 | Wang | G06F 3/0482 |
| 2019/0318540 A1* | 10/2019 | Piemonte | H04L 67/131 |
| 2020/0073858 A1* | 3/2020 | Maeda | G06F 3/04845 |
| 2021/0304702 A1 | 9/2021 | Sato et al. | |
| 2021/0319625 A1* | 10/2021 | Goodrich | G06F 3/011 |
| 2022/0019345 A1* | 1/2022 | Li | G06F 1/1647 |

OTHER PUBLICATIONS

International Patent Application No. PCT/SG2022/050929; Int'l Search Report; dated Jul. 3, 2023; 3 pages.

\* cited by examiner

VISUAL EFFECT DESIGN USING MULTIPLE PREVIEW WINDOWS

BACKGROUND

Communication is increasingly being conducted using Internet-based tools. The Internet-based tools may be any software or platform. Such internet-based tools may design new programs or features, such as visual effects, for the users of the internet-based tools. However, the design process for such new features can be complicated or inefficient. Improved techniques for feature design are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

Communication can be conducted using Internet-based tools that allow users to create content and distribute such content to other users for consumption. Such Internet-based tools may provide users with various effects to use when creating content. The effects can include, for example, augmented reality (AR) effects. AR effects are computer-generated effects layered over the real-life image that a user's camera displays. For example, if a user wants to create content using an AR effect, the user may open a device's camera to present the physical world onscreen live. The AR effect superimposes or overlays two-dimensional (2D) or three-dimensional (3D) virtual objects on the camera feed, creating the illusion that these objects actually exist.

However, designing such AR effects can be complicated and time-consuming. When front-end engineers, such as UI/UX designers (hereafter referred to as "designers") work on complicated effects, a lot of time is wasted on repetitive testing of multiple inputs, such as different facial expressions or text. Creating complicated effects with a single preview panel can be cumbersome, especially if a designer wants to compare multiple versions of an effect with tweaked parameters. For example, a game effect might have a win, loss, and tie state. Testing each of these states would require the designer to play the game at least three times every time he or she makes a script change or a visual change. To complicate matters further, designers often have multiple variations of visual assets, such as user interface (UI) elements, that they want to compare. It may be time-consuming for designers to do so, as the designers may not be equipped with tools that allow them to perform AB testing on these visual differences.

Described herein are techniques for improved design and testing of complicated effects, such as AR effects. Using the techniques described herein, a designer can spawn multiple preview windows associated with a single effects design project. Each preview window may allow a designer to view a different version of an effect while simultaneously viewing the versions of the effect displayed in the other preview windows. For example, a designer can spawn multiple preview windows on a 3D scene in a game engine. Each preview window displays the current state of the effect as well as any additional objects that the designer has added to that scene. The content displayed in each preview window can be adjusted separately from the content displayed in the other preview windows. For example, each preview window can retain changes that are unique to itself. The techniques described herein allow for faster testing of edge cases and inputs in parallel and provide designers with an easier way to compare different visual asset choices side-by-side.

Figure 1:
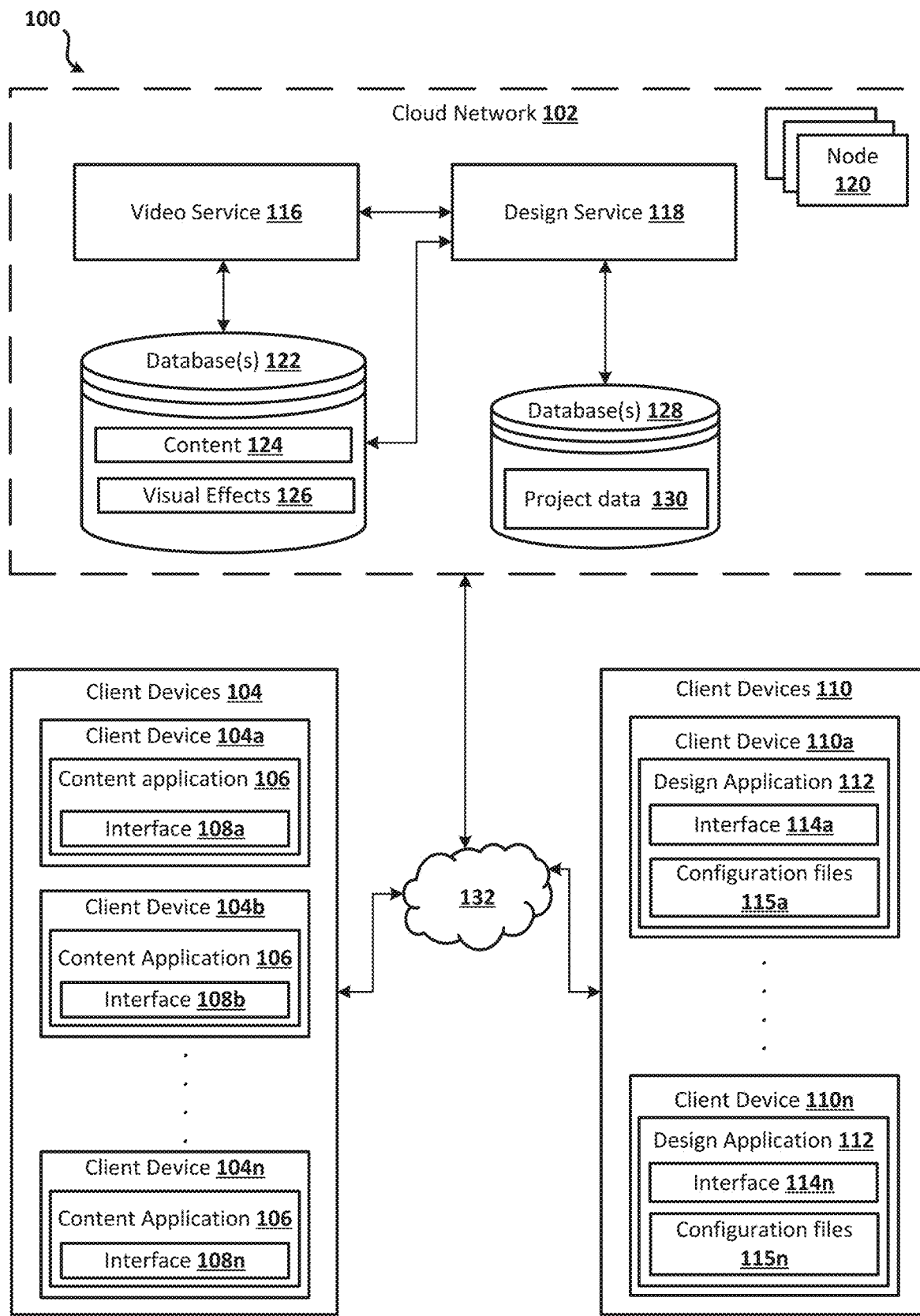
FIG. 1 shows an example system for designing new features which may be used in accordance with the present disclosure.

FIG. 1 illustrates an example system 100 for designing new features, such as effects, that may be used to create content for distribution. The system 100 may comprise a cloud network 102, a first plurality of client devices 104a-n, and a second plurality of client devices 110a-n. The cloud network 102, the first plurality of client devices 104a-n, and/or the second plurality of client devices 110a-n may communicate with each other via one or more networks 132.

The cloud network 102 may be located at a data center, such as a single premise, or be distributed throughout different geographic locations (e.g., at several premises). The cloud network 102 may provide the services via the one or more networks 132. The network 132 comprise a variety of network devices, such as routers, switches, multiplexers, hubs, modems, bridges, repeaters, firewalls, proxy devices, and/or the like. The network 132 may comprise physical links, such as coaxial cable links, twisted pair cable links, fiber optic links, a combination thereof, and/or the like. The network 132 may comprise wireless links, such as cellular links, satellite links, Wi-Fi links and/or the like.

The cloud network 102 may comprise a plurality of computing nodes 120 that host a variety of services. In an embodiment, the nodes 120 host a video service 116. The video service 116 may comprise a content streaming service, such as an Internet protocol video streaming service. The video service 116 may be configured to distribute content 124 via a variety of transmission techniques. The video service 116 is configured to provide the content 124, such as video, audio, textual data, a combination thereof, and/or the like. The content 124 may comprise content streams (e.g., video stream, audio stream, information stream), content files (e.g., video file, audio file, text file), and/or other data. The content 124 may be stored in a database 122. For example, the video service 116 may comprise a video sharing service, a video hosting platform, a content distribution platform, a collaborative gaming platform, and/or the like.

In an embodiment, the content 124 distributed or provided by the video service 116 comprises short videos. The short videos may have a duration less than or equal to a predetermined time limit, such as one minute, five minutes, or other predetermined minutes. By way of example and without limitation, the short videos may comprise at least one, but no more than four, 15 second segments strung together. The short duration of the videos may provide viewers with quick bursts of entertainment that allow users to watch a large quantity of videos in a short time frame. Such quick bursts of entertainment may be popular on social media platforms.

The short videos may comprise a pre-recorded audio overlay, such as a clip of a pre-recorded song or audio from a television show or movie. If a short video comprises a pre-recorded audio overlay, the short video may feature one or more individuals lip-syncing, dancing, or otherwise moving their body along with the pre-recorded audio. For example, a short video may feature an individual completing a "dance challenge" to a popular song or a short video may feature two individuals participating in a lip-syncing or dancing duet. As another example, a short video may feature an individual completing a challenge that requires them to move his or her body in a manner that corresponds to the pre-recorded audio overlay, such as in a manner that corresponds to the beat or rhythm of the pre-recorded song featured by the pre-recorded audio overlay. Other short videos may not comprise a pre-recorded audio overlay. For example, these short videos may feature an individual playing sports, pulling pranks, or giving advice, such as beauty and fashion advice, cooking tips, or home renovation tips.

In an embodiment, the content 124 may be output to different client devices 104a-n via the network 132. The content 124 may be streamed to the client devices 104a-n. The content stream may be a stream of short videos received from the video service 116. The first plurality of client devices 104a-n may be configured to access the content 124 from the video service 116. In an embodiment, a client device 104a-n may comprise a content application 106. The content application 106 outputs (e.g., display, render, present) the content 124 to a user associated with the client device 104a-n. The content may comprise videos, audio, comments, textual data and/or the like.

The first plurality of client devices 104a-n may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The first plurality of client devices 104a-n may be associated with one or more users. A single user may use one or more of the first plurality of client devices 104a-n to access the cloud network 102. The first plurality of client devices 104a-n may travel to a variety of locations and use different networks to access the cloud network 102.

The video service 116 may be configured to receive input from users. The users may be registered as users of the video service 116 and may be users of the content application 106 operating on client devices 104a-n. The user inputs may include short videos created by users, user comments associated with short videos, or "likes" associated with short videos. The user inputs may include connection requests and user input data, such as text data, digital image data, or user content. The connection requests may comprise requests from the client devices 104a-na-d to connect to the video service 116. The user input data may include information, such as short videos and/or user comments, that the users connected to the video service 116 want to share with other connected users of the video service 116.

The video service 116 may be able to receive different types of input from users using different types of client devices 104a-n. For example, a user using the content application 106 on a first user device, such as a mobile phone or tablet, may be able to create and upload short videos using the content application 106. A user using the content application 106 on a different mobile phone or tablet may also be able to view, comment on, or "like" short videos or comments written by other users. In another example, a user using the content application 106 on a smart television, laptop, desktop, or gaming device may not be able to create and upload short videos or comment on short videos using the content application 106. Instead, the user using the content application 106 on a smart television, laptop, desktop, or gaming device may only be able to use the content application 106 to view short videos, view comments left by other users, and "like" short videos.

In an embodiment, a user may use the content application 106 on a client device 104a-n to create a short video and upload the short video to the cloud network 102. The client devices 104a-n may access an interface 108a-n of the content application 106. The interface 108a-n may comprise an input element. For example, the input element may be configured to allow users to create the short video. To create the short video, the user may give the content application 106 permission to access an image capture device, such as a camera, or a microphone of the client device 104a-n. Using the content application 106, the user may select a duration for the short video or set a speed for the short video, such as "slow-motion" or "speed things up."

The user may edit the short video using the content application 106. The user may add one or more texts, filters, sounds, or effects, such as AR effects, to the short video. To add a pre-recorded audio overlay to the short video, the user may select a song or sound clip from a sound library of the content application 106. The sound library may include different songs, sound effects, or audio clips from movies, albums, and television shows. In addition to or in lieu of adding a pre-recorded audio overlay to the short video, the user may use the content application 106 to add a voice-over to the short video. The voice-over may be a sound recorded by the user using a microphone of the client device 104a-n. The user can add a text overlay to the short video and may use the content application 106 to specify when they want the text overlay to appear in the short video. The user may assign a caption, location tag, and one or more hashtags to the short video to indicate the subject matter of the short video. The content application 106 may prompt the user to select a frame of the short video to use as a "cover image" for the short video.

After the user has created the short video, the user may use the content application 106 to upload the short video to the cloud network 102 and/or to save the short video locally to the user device 104a-n. When a user uploads the short video to the cloud network 102, they may choose whether they want the short video to be viewable by all other users of the content application 106 or viewable by only a subset of the users of the content application 106. The video service 116 may store the uploaded short videos and any metadata associated with the short videos as content 124 in one or more databases 122.

In an embodiment, a user may use the content application 106 on a client device 104a-n to provide input on a short video. The client devices 104a-n may access an interface 108a-n of the content application 106 that allows users to provide input associated with short videos. The interface 108a-n may comprise an input element. For example, the input element may be configured to receive input from a user, such as comments or "likes" associated with a particular short video. If the input is a comment, the content application 106 may allow a user to set an emoji associated with his or her input. The content application 106 may determine timing information for the input, such as when a user wrote a comment. The content application 106 may send the input and associated metadata to the cloud network 102. For example, the content application 106 may send a comment, an identifier of the user that wrote the comment, and the timing information for the comment to the cloud network 102. The video service 116 may store the input and associated metadata in a database 122.

The video service 116 may be configured to output the uploaded short videos and user input to other users. The users may be registered as users of the video service 116 to view short videos created by other users. The users may be users of the content application 106 operating on client devices 104a-n. The content application 106 may output (display, render, present) the short videos and user comments to a user associated with a client device 104a-n. The client devices 104a-n may access an interface 108a-n of the content application 106. The interface 108a-n may comprise an output element. The output element may be configured to display information about different short videos so that a user can select a short video to view. For example, the output element may be configured to display a plurality of cover images, captions, or hashtags associated with the short videos. The output element may also be configured to arrange the short videos according to a category associated with each short video.

In an embodiment, the user comments associated with a short video may be output to other users watching the same short video. For example, all users accessing a short video may view comments associated with the short video. The video service 116 may output the short video and the associated comments simultaneously. Comments may be output by the video service 116 in real-time or near-real-time. The content application 106 may display the short videos and comments in various ways on the client device 104a-n. For example, the comments may be displayed in an overlay above the content or in an overlay beside the content. As another example, a user that wants to view other users' comments associated with a short video may need to select a button in order to view the comments. The comments may be animated when displayed. For example, the comments may be shown scrolling across the short video or across the overlay.

The plurality of computing nodes 120 may process tasks associated with the video service 116. The plurality of computing nodes 120 may be implemented as one or more computing devices, one or more processors, one or more virtual computing instances, a combination thereof, and/or the like. The plurality of computing nodes 120 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

In an embodiment, the video service 116 may provide a plurality of visual effects 126 to users of the video service 116 so that the users can create videos, such as short videos, using one or more of these effects. The effects 126 can include, for example, one or more AR effects. AR effects are computer-generated effects layered over the real-life image that a user's camera displays. However, for the reasons described above, designing such effects 126 can be complicated and time-consuming.

In an embodiment, the nodes 120 host a design service 118. The design service 118 may be configured to facilitate the design of effects 126 by a designer associated with a client device of the second plurality of client devices 110a-n. The second plurality of client devices 110a-n may be different from the first plurality of client devices 104a-n. For example, the second plurality of client devices 110a-n may each be associated with one or more designers that want to design an effect 126, so that the users associated with the first plurality of client devices 104a-n can create videos using the designed effects 126 via the content application 106. The second plurality of client devices 110a-n may comprise the design application 112. The design application 112 may be used by the designers to design effects 126. For example, the designers can access an interface 114a-n of the design application 112 to design effects 126.

The second plurality of client devices 110a-n may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. A single designer may use one or more of the second plurality of client devices 110a-n to access the cloud network 102. The second plurality of client devices 110a-n may travel to a variety of locations and use different networks to access the cloud network 102.

The design service 118 may be configured to maintain, in a database 128, project data 130. The stored project data 130 may be received, for example, from designers associated with the client devices 110a-n. The project data 130 may include data associated with various design projects. Each design project may be associated with the design of a particular effect 126. For example, the project data 130 may include data associated with a first project. The first project may be associated with the design of a first effect 126, and the first project may be associated with one or more scenes that comprise the first effect 126. The project data 130 associated with the first project may indicate the current state of the design of the first effect 126. For example, the project data 130 associated with the first project may indicate all work that has been saved and/or uploaded to the cloud network 102. However, the project data 130 may not indicate changes or modifications to first effect 126 that the designer tried out or tested during the design process but decided not to implement.

In an embodiment, the design service 118 is configured to send, to client devices 110a-n, the project data 130. For example, the design service 118 may send, to a client device 110a-n, the project data 130 associated with a first project in response to receiving a request from that client device. The request may include an indication of a selection of the first project. For example, a designer may select the first project if the designer wants to work on the design of the first effect. The designer may want to work on the project for the first time, or the designer may want to continue previous work that the designer (or even another designer) has done on the first project. In response to receiving such a request, the design service 118 can send the project data 130 indicating the current state of the first project to the client device 110a-n.

In embodiments, the client devices 110a-n are configured to receive, from the design service 118, the project data 130. For example, the client devices 110a-n may receive the project data 130 associated with the first project in response to sending a request for the project data 130 associated with the first project to the design service 118. The client devices 110a-n may send the request for the project data 130 associated with the first project to the design service 118 if the designer selects the first project in the design application 112 via the interface 114a-n of the design application 112. The designer may select the first project in the design application if the designer wants to start or continue work on the design of the first effect.

In embodiments, if the client devices 110a-n receive, from the design service 118, project data 130, a main preview window of the at least one scene comprising the first effect may be displayed on the interface 114a-n. As described above, the project data 130 associated with a particular project may indicate the current design state of the effect associated with that project. Accordingly, the main preview window provides a display or preview of what the effect would currently look like to a user 104a-n when it is applied on an image or video feed, based on the current design state of the effect. For example, the main preview window may render an AR effect to a 2D texture. The designer can view the main preview window to gain an understanding of how the original scene would look (e.g., how the effect would look if no more changes or modifications were made to the design of the effect).

In embodiments, the designers may utilize the design application 112 to test out various changes to a scene comprising an effect. For example, after the main preview window of a scene comprising the first effect is displayed on the interface 114a-n, a designer may want to see the impact of various modifications or changes to the design of the effect. To do so, the designer can utilize the design application 112 to spawn multiple secondary preview windows associated with the project. Each secondary preview window may resemble the main preview window. For example, each secondary preview window may render an AR effect to a 2D texture. To spawn a secondary preview window associated with the project, the designer may select a button (e.g., a (+) button) on the interface 114a-n of the design application. Each time the designer selects the button, an additional secondary preview window may be spawned and displayed on the interface 114a-n. The designer may spawn as many secondary preview windows as he or she desires.

Each secondary preview window displays the current state of the effect (such as that indicated by the main preview window) as well as any additional objects that the designer has added to that scene to test them out. The content displayed in each secondary preview window can be adjusted separately from the content displayed in the other secondary preview windows. Such adjustments may only apply locally (e.g., only apply on the client devices 110a-n) and will not appear on the design service 118 side, because one purpose of these multiple secondary preview windows is to test what edits to properties of the original scene would look like (and not necessarily to make final adjustments to the project data 130).

In embodiments, data associated with the multiple secondary preview windows may be saved in individual configuration files 115a-n. For example, if a designer spawns three secondary preview windows associated with the first effect design project, three configuration files, one corresponding to each secondary preview window, may be saved locally on the client device 110a-n, but not on the server-side (e.g., may not be saved as project data 130). The configuration files 115a-n may be modified to indicate the adjustments made to content displayed in the corresponding secondary preview window. For example, if a designer makes a change to at least one attribute of the effect in a particular secondary preview window corresponding to a particular configuration file, that particular configuration file may be modified to reflect this attribute change. The modified configuration files may be further modified if/when additional design changes are made. In embodiments, the project data 120 may comprise a "main" configuration file in the root of a project folder. The main configuration file may be utilized to keep track of how many secondary preview windows a project contains. This may allow the project to automatically spawn the preview processes.

In an embodiment, a designer may want to pick-up a design project where he or she last left off. For example, a designer may have made a change to at least one attribute of an effect in a particular secondary preview window corresponding to a particular configuration file. That particular configuration file may have already been modified to reflect this attribute change. The designer may decide to take a break or exit out of the design application 112. The designer (or a different designer) may later load the locally saved, modified configuration files to continue work on the design project. If the designer (or a different designer) later loads the locally saved, modified configuration files, secondary preview windows may be displayed based on the modified configuration files. The designer may make additional design changes within the secondary preview windows. If so, the modified configuration files may be further modified and saved locally.

In an embodiment, the designer may want to make an actual change (not just a locally saved change) to the design of an effect 126. For example, after viewing the previous window(s), the designer may decide that the designer likes the way a particular design change or modification looks. The designer may decide that this particular design change or modification should be implemented in the final design of the effect 126. Accordingly, the designer may indicate, such as via the interface 114a-n of the design application 112, that such design change or modification should be made on the server-side. If the designer does so, an indication may be sent to the design service 118. The indication may instruct the design service 118 to update the project data 130 associated with the project of the corresponding effect based on this design change or modification.

In an embodiment, the design service 118 is configured to receive, from client devices 110a-n, data indicative of updates (e.g., changes or modifications) to the project data 130. For example, the design service 118 can receive the indication that instructs the design service 118 to update the project data 130 associated with a project corresponding to an effect that has a modified or changed design. The design service 118 may update the project data 130 in response to receiving such an indication.

When the design service 118 makes changes to the project data 130 associated with an effect, the design service 118 may send a message (e.g., socket message) to the client devices 110*a-n* instructing the client devices 110*a-n* to update the main preview window displaying a scene comprising the effect. As a result, the designer that made the change or modification to the effect may see the main preview window change so that the main preview window now reflects the recent change or modification. Additionally, any other designer that later works on the design of this particular effect will see this updated main preview window (instead of the preview window that was displayed before these changes to the design were implemented). If the main preview window displaying a scene comprising the effect is updated, any spawned secondary preview window that is currently open (or that is opened at a later time) can additionally be updated to reflect the recent design change or modification.

In an embodiment, after a designer has used the design service 118 to create an effect, the effect may be stored as a visual effect 126 in the database 122. The stored effect 126 can be used by the users associated with the first plurality of client devices 104*a-n* to create videos via the content application 106. As described above, the plurality of effects 126 can include one or more AR effects. If the user selects an AR effect to create a video, the AR effect may overlay or superimpose at least one 2D or 3D virtual object on at least one subset of frames of the video. For example, if the user wants to create a video using an AR effect, the user may open a camera of a client device 104*a-n* to present the physical world onscreen live. The AR effect superimposes or overlays 2D or 3D virtual objects on the camera feed, creating the illusion that these objects actually exist. After the video has been created with the effect, the video may be uploaded to the cloud network 102 and/or the user may save the video locally to the client device 104*a-n*. The video service 116 may be configured to output the uploaded video created with the effect to other users that are registered as users of the video service 116 via the content application 106. The other users may consume the video created with the effect.

Figure 2:
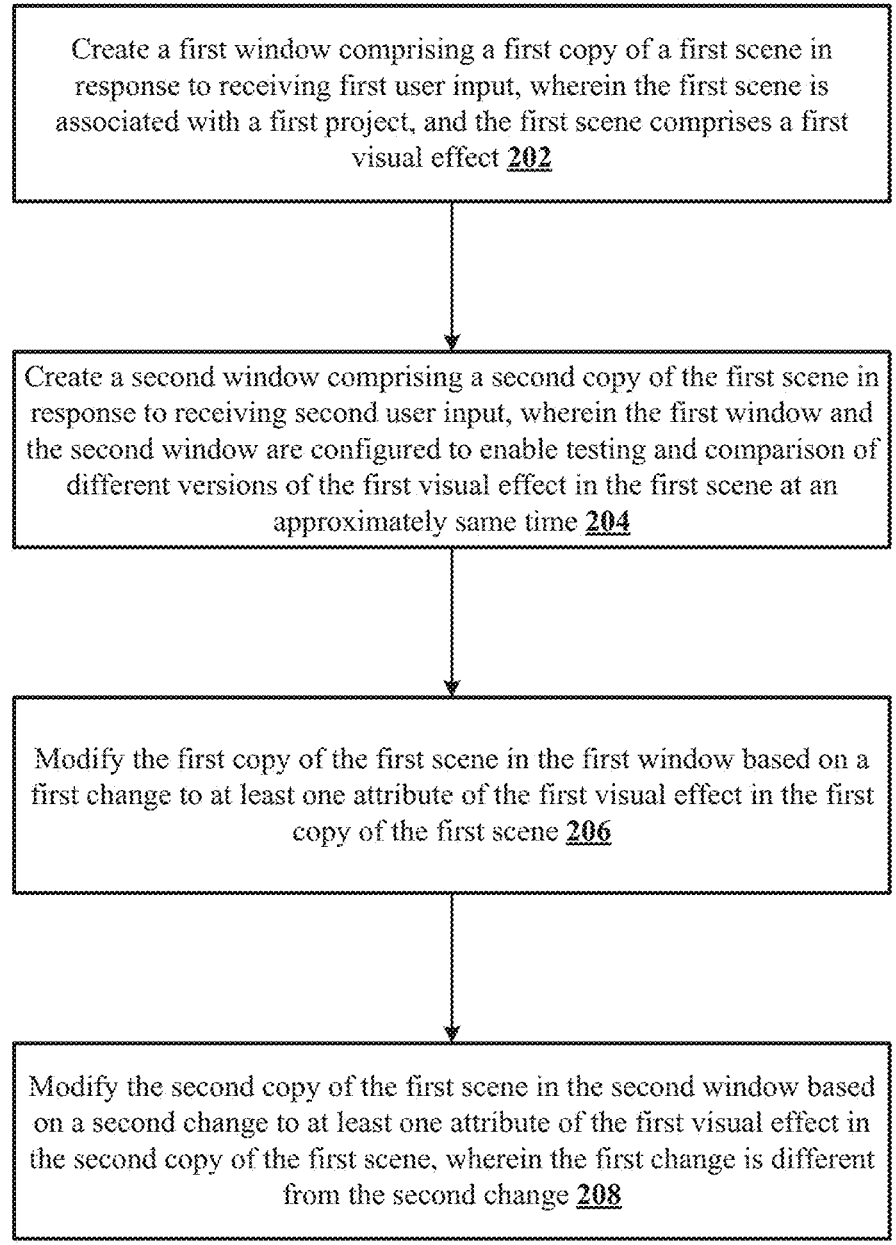
FIG. 2 shows an example process for designing new features which may be performed by a client device in accordance with the present disclosure.

FIG. 2 illustrates an example process 200 performed by a client device of the second plurality of client devices (e.g., client device 110*a-n*). The client device 110*a-n* may perform the process 200 to design an effect, such as an AR effect. Although depicted as a sequence of operations in FIG. 2, those of ordinary skill in the art will appreciate that various embodiments may add, remove, reorder, or modify the depicted operations.

As described above, a designer may utilize the design application 112 on a client device 110*a-n* to spawn secondary multiple preview windows associated with a first effect design project. One purpose of these multiple secondary preview windows is to test what edits to properties of an original scene would look like. At 202, a first window comprising a first copy of a first scene in response to receiving first user input may be created. The first user input may be received when a designer (e.g., user) selects a button (e.g., a (+) button) on the interface 114*a-n* of the design application. Each time the designer selects the button, an additional secondary preview window may be spawned and displayed on the interface 114*a-n*. The designer may spawn as many secondary preview windows as he or she desires. The first scene is associated with a first project, and the first scene comprises a first visual effect. The first visual effect may comprise rendering an augmented reality (AR) effect on one or more images.

At 204, a second secondary preview window comprising a second copy of the first scene may be created in response to receiving second user input. For example, the second user input may be received when the when the designer (e.g., user) selects the button (e.g., a (+) button) on the interface 114*a-n* of the design application for a second time. The first secondary window and the second secondary window are configured to enable AB testing and comparison of different versions of the first visual effect in the first scene at an approximately same time.

As described above, each secondary preview window displays the current state of the first effect as well as any additional objects that the designer has added to that scene. The content displayed in each secondary preview window can be adjusted separately from the content displayed in the other secondary preview windows. At 206, the first copy of the first scene in the first secondary window may be modified based on a first change to at least one attribute of the first visual effect in the first copy of the first scene. Such modification only applies locally (e.g., only apply on the client device 110*a-n*) and will not appear on the design service 118 side, because a purpose of these multiple secondary preview windows is to view what edits to properties of the original scene would look like (and not necessarily to make final adjustments to the project data 130). For example, such modification may not affect the main preview window associated with the project.

At 208, the second copy of the first scene in the second secondary preview window may be modified based on a second change to at least one attribute of the first visual effect in the second copy of the first scene. The first change is different from the second change. Such modification only applies locally (e.g., only apply on the client device 110*a-n*) and will not appear on the design service 118 side, because a purpose of these multiple secondary preview windows is to view what edits to properties of the original scene would look like (and not necessarily to make final adjustments to the project data 130. For example, such modification may not affect the main preview window associated with the project.

Figure 3:
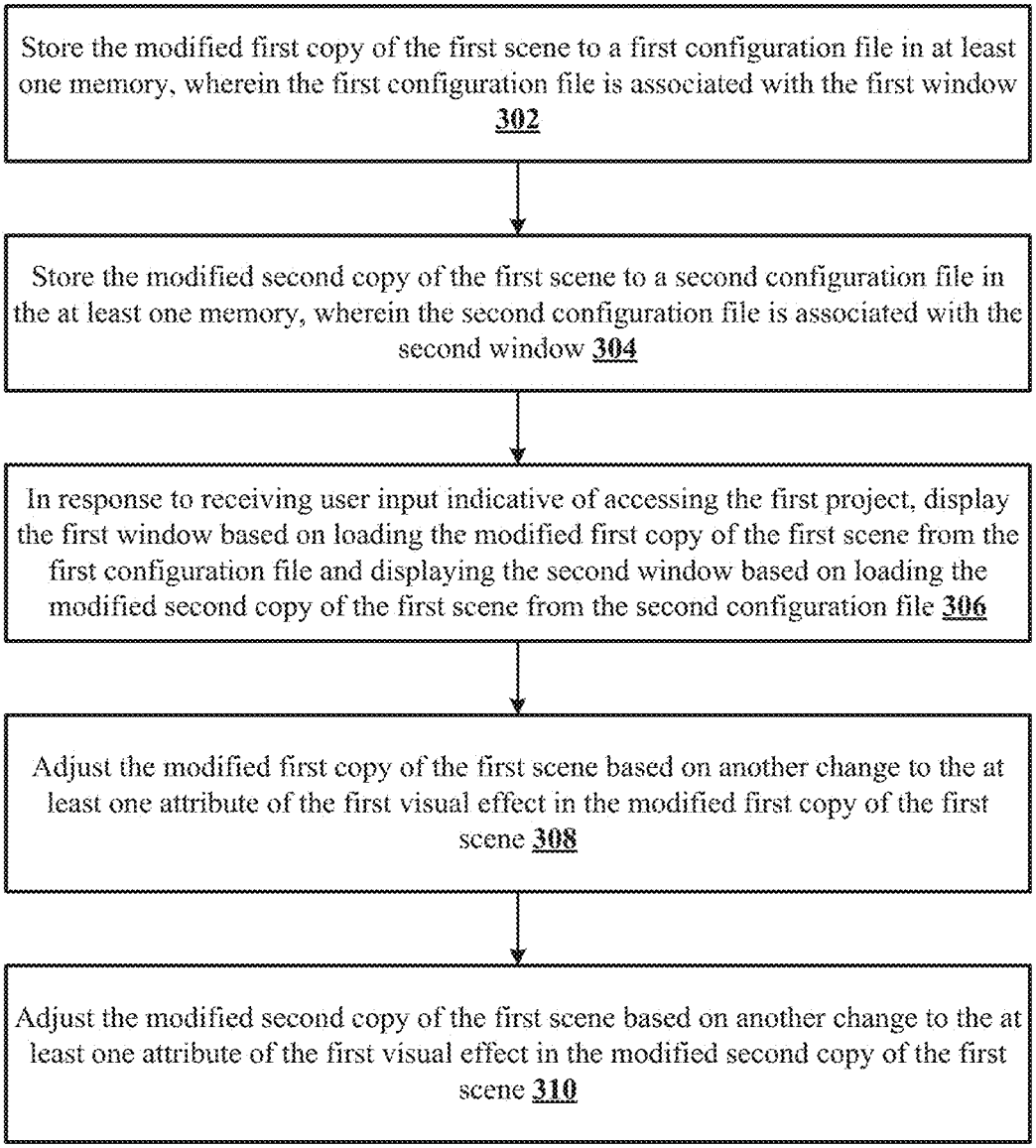
FIG. 3 shows another example process for designing new features which may be performed by a client device in accordance with the present disclosure.

FIG. 3 illustrates an example process 300 performed by a client device of the second plurality of client devices (e.g., client device 110*a-n*). The client device 110*a-n* may perform the process 300 to design an effect, such as an AR effect. Although depicted as a sequence of operations in FIG. 3, those of ordinary skill in the art will appreciate that various embodiments may add, remove, reorder, or modify the depicted operations.

As described above with regard to FIG. 2, the first copy of the first scene in the first secondary window may be modified based on a first change to at least one attribute of the first visual effect in the first copy of the first scene, and the second copy of the first scene in the second secondary window may be modified based on a second change to at least one attribute of the first visual effect in the second copy of the first scene. The first change is different from the second change. Such modified copies may be locally stored in configuration files. At 302, the modified first copy of the first scene may be stored to a first configuration file in at least one memory. The first configuration file is associated with the first secondary window. The first configuration file may be saved locally in at least one memory of the client device 110*a-n*.

At 304, the modified second copy of the first scene may be stored to a second configuration file in the at least one memory. The second configuration file is associated with the second secondary window. The first and second configuration files may only be stored locally (e.g., only on the client device 110a-n) and not on the database 128 on design service 118 side, because the purpose of these multiple secondary preview windows is to test what edits to properties of the original scene would look like (and not necessarily to make final adjustments to the project data 130).

The user, or a different user, may decide, such as at a later time, to return to the design project. For example, the designer (or a different designer) may later load the locally saved, modified configuration files to continue work on the design project. If the designer (or a different designer) later loads the locally saved, modified configuration files via the design application 112, secondary preview windows may be displayed based on the modified configuration files. At 306, in response to receiving user input indicative of accessing the first project, the first window may be displayed based on loading the modified first copy of the first scene from the first configuration file. The second window may also be displayed based on loading the modified second copy of the first scene from the second configuration file.

The designer may make additional design changes within the secondary preview windows. If so, the modified configuration files may be further modified and saved locally. At 308, the modified first copy of the first scene may be adjusted based on another change to the at least one attribute, or a different attribute, of the first visual effect in the modified first copy of the first scene. At 310, the modified second copy of the first scene may be adjusted based on another change to the at least one attribute, or a different attribute, of the first visual effect in the modified second copy of the first scene. The further modified configuration files may remain stored locally and may be accessed for further modification at a later time.

Figure 4:
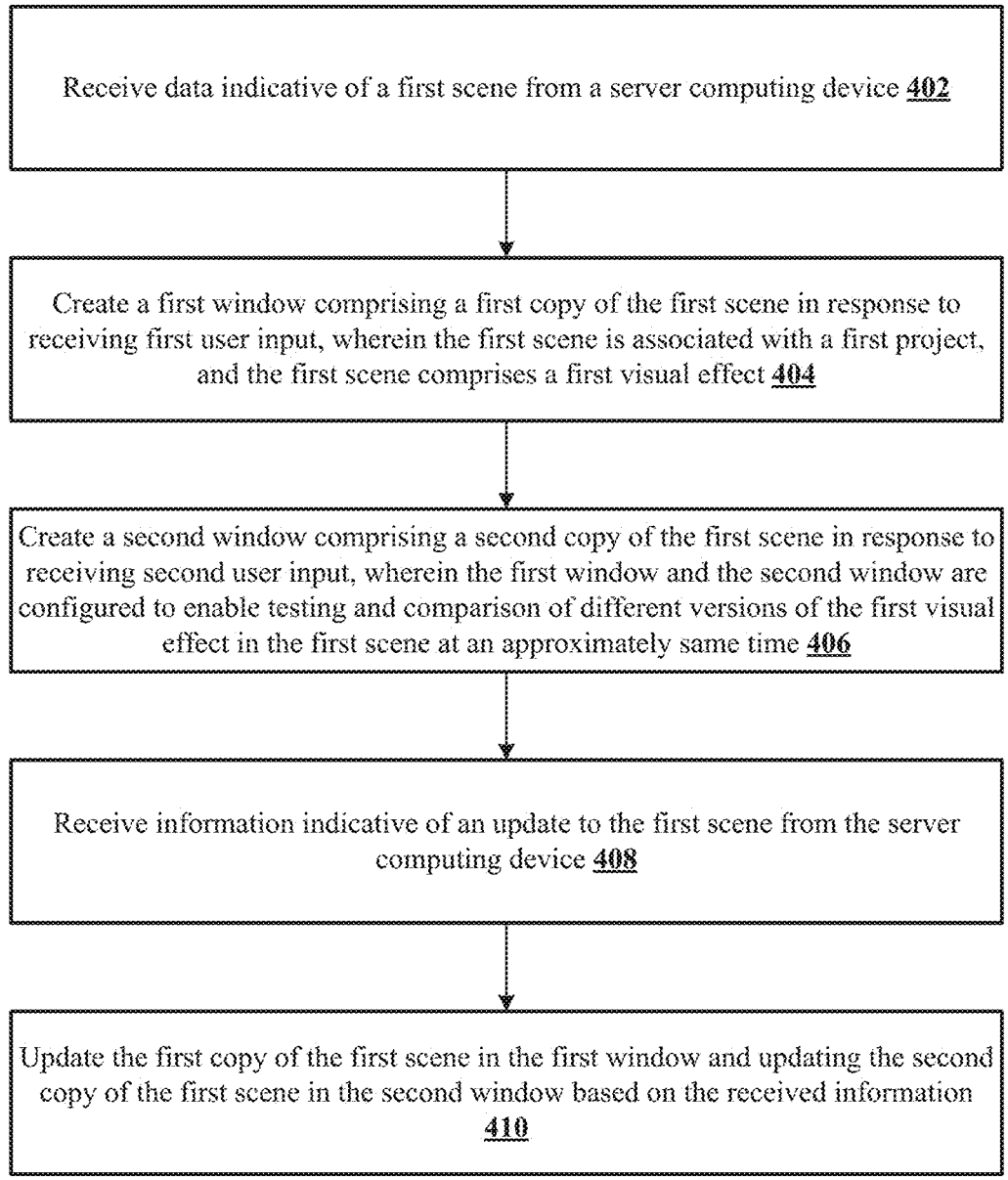
FIG. 4 shows another example process for designing new features which may be performed by a client device in accordance with the present disclosure.

FIG. 4 illustrates an example process 400 performed by a client device of the second plurality of client devices (e.g., client device 110a-n). The client device 110a-n may perform the process 400 to design an effect, such as an AR effect. Although depicted as a sequence of operations in FIG. 4, those of ordinary skill in the art will appreciate that various embodiments may add, remove, reorder, or modify the depicted operations.

As described above, the client devices 110a-n are configured to receive, from the design service 118, the project data 130. For example, the client devices 110a-n may receive the project data 130 associated with the first project in response to sending a request for the project data 130 associated with the first project to the design service 118. The client devices 110a-n may send the request for the project data 130 associated with the first project to the design service 118 if the designer selects the first project in the design application 112 via the interface 114a-n of the design application 112. The designer may select the first project in the design application if the designer wants to start or continue work on the design of the first effect. At 402, data indicative of a first scene may be received from a server computing device.

A main preview window of the at least one scene comprising the first effect may be displayed. As described above, the data indicative of a first scene that is received from the server may indicate the current design state of the effect associated with that project. The main preview window provides a display or preview of what the effect would currently look like to a user 104a-n, based on the current design state of the effect. The designer can view the main preview window to gain an understanding of how the effect would look if no more changes or modifications were made to the design of the effect.

In embodiments, the designers may utilize the design application 112 to test out various changes to a scene comprising an effect. For example, after the main preview window of a scene comprising the first effect is displayed on the interface 114a-n, a designer may want to see the impact of various modifications or changes to the design of the effect. To do so, the designer can utilize the design application 112 to spawn multiple secondary preview windows associated with the project. One purpose of these multiple secondary preview windows is to test what edits to properties of an original scene would look like.

At 404, a first window comprising a first copy of a first scene in response to receiving first user input may be created. The first user input may be received when a designer (e.g., user) selects a button (e.g., a (+) button) on the interface 114a-n of the design application. Each time the designer selects the button, an additional secondary preview window may be spawned and displayed on the interface 114a-n. The designer may spawn as many secondary preview windows as he or she desires. The first scene is associated with a first project, and the first scene comprises a first visual effect. The first visual effect may comprise rendering an augmented reality (AR) effect on one or more images.

At 406, a second secondary preview window comprising a second copy of the first scene may be created in response to receiving second user input. For example, the second user input may be received when the when the designer (e.g., user) selects the button (e.g., a (+) button) on the interface 114a-n of the design application for a second time. The first secondary window and the second secondary window are configured to enable AB testing and comparison of different versions of the first visual effect in the first scene at an approximately same time.

In an embodiment, the design service 118 is configured to receive, from client devices 110a-n, data indicative of updates (e.g., changes or modifications) to the project data 130. For example, the design service 118 can receive an indication that instructs the design service 118 to update the project data 130 associated with a project corresponding to an effect that has a modified or changed design. The design service 118 may update the project data 130 in response to receiving such an indication.

When the design service 118 makes changes to the project data 130 associated with an effect, the design service 118 may send a message (e.g., socket message) to the client devices 110a-n instructing the client devices 110a-n to update the main preview window displaying a scene comprising the effect. At 408, information indicative of an update to the first scene may be received from the server computing device. As a result, the designer that made the change or modification to the effect may see the main preview window change so that the main preview window now reflects the recent change or modification. Additionally, any other designer that later works on the design of this particular effect will see this updated main preview window (instead of the preview window that was displayed before these changes to the design were implemented). If the main preview window displaying a scene comprising the effect is updated, any spawned secondary preview window that is currently open (or that is opened at a later time) can additionally be updated to reflect the recent design change or modification. At 410, the first copy of the first scene in the first window and the second copy of the first scene in the second window may be updated based on the received information.

Figure 5:
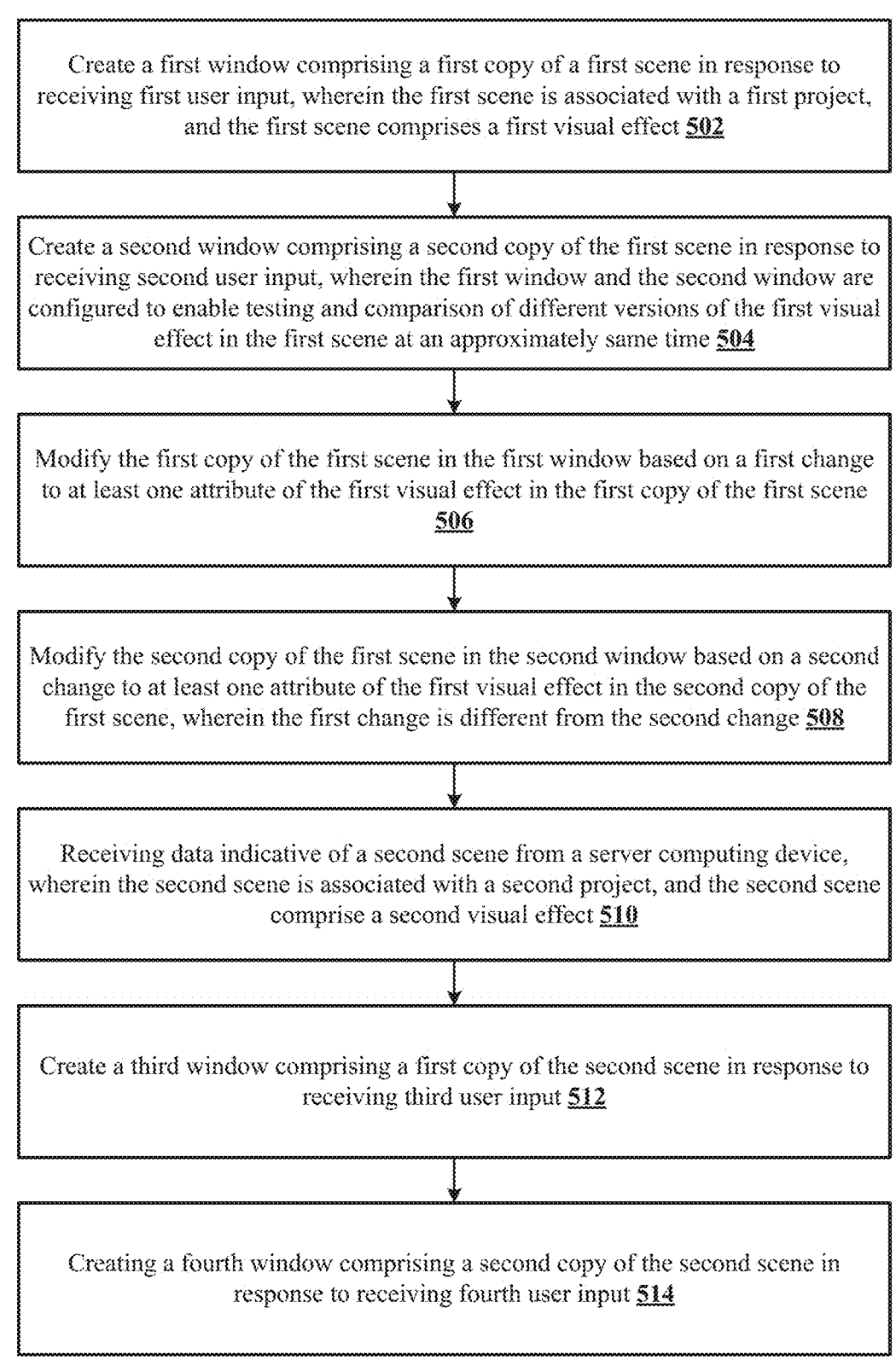
FIG. 5 shows another example process for designing new features which may be performed by a client device in accordance with the present disclosure.

FIG. 5 illustrates an example process 500 performed by a client device of the second plurality of client devices (e.g., client device 110a-n). The client device 110a-n may perform the process 500 to design an effect, such as an AR effect. Although depicted as a sequence of operations in FIG. 5, those of ordinary skill in the art will appreciate that various embodiments may add, remove, reorder, or modify the depicted operations.

As described above, a designer may utilize the design application 112 on a client device 110a-n to spawn secondary multiple preview windows associated with a first effect design project. One purpose of these multiple secondary preview windows is to test what edits to properties of an original scene would look like. At 502, a first window comprising a first copy of a first scene in response to receiving first user input may be created. The first user input may be received when a designer (e.g., user) selects a button (e.g., a (+) button) on the interface 114a-n of the design application. Each time the designer selects the button, an additional secondary preview window may be spawned and displayed on the interface 114a-n. The designer may spawn as many secondary preview windows as he or she desires. The first scene is associated with a first project, and the first scene comprises a first visual effect. The first visual effect may comprise rendering an augmented reality (AR) effect on one or more images.

At 504, a second secondary preview window comprising a second copy of the first scene may be created in response to receiving second user input. For example, the second user input may be received when the when the designer (e.g., user) selects the button (e.g., a (+) button) on the interface 114a-n of the design application for a second time. The first secondary window and the second secondary window are configured to enable AB testing and comparison of different versions of the first visual effect in the first scene at an approximately same time.

As described above, each secondary preview window displays the current state of the first effect as well as any additional objects that the designer has added to that scene. The content displayed in each secondary preview window can be adjusted separately from the content displayed in the other secondary preview windows. At 506, the first copy of the first scene in the first secondary window may be modified based on a first change to at least one attribute of the first visual effect in the first copy of the first scene. Such modification only applies locally (e.g., only apply on the client device 110a-n) and will not appear on the design service 118 side, because a purpose of these multiple secondary preview windows is to view what edits to properties of the original scene would look like (and not necessarily to make final adjustments to the project data 130). For example, such modification will not affect the main preview window associated with the project.

At 508, the second copy of the first scene in the second secondary preview window may be modified based on a second change to at least one attribute of the first visual effect in the second copy of the first scene. The first change is different from the second change. Such modification only applies locally (e.g., only apply on the client device 110a-n) and will not appear on the design service 118 side, because a purpose of these multiple secondary preview windows is to view what edits to properties of the original scene would look like (and not necessarily to make final adjustments to the project data 130. For example, such modification will not affect the main preview window associated with the project.

The designer may decide to work on a different project. For example, the designer may decide to work on the design of a second, different visual effect instead of the first visual effect. The client devices 110a-n may receive the project data 130 associated with the second project in response to sending a request for the project data 130 associated with the second project to the design service 118. At 510, data indicative of a second scene may be received from a server computing device. The second scene is associated with the second project, and the second scene comprise a second visual effect. The client devices 110a-n may send the request for the project data 130 associated with the second project to the design service 118 if the designer selects the second project in the design application 112 via the interface 114a-n of the design application 112. The designer may select the second project in the design application if the designer wants to start or continue work on the design of the second effect.

In embodiments, if the client devices 110a-n receive, from the design service 118, project data 130, display of a main preview window of the second scene comprising the second effect may be displayed on the interface 114a-n. As described above, the project data 130 associated with a particular project may indicate the current design state of the effect associated with that project. Accordingly, the main preview window provides a display or preview of what the second effect would currently look like to a user 104a-n, based on the current design state of the second effect. The designer can view the main preview window to gain an understanding of how the second effect would look if no more changes or modifications were made to the design of the second effect.

In embodiments, the designers may utilize the design application 112 to test out various changes to the second scene comprising the second effect. For example, after the main preview window of the second scene comprising the second effect is displayed on the interface 114a-n, a designer may want to see the impact of various modifications or changes to the design of the second effect. To do so, the designer can utilize the design application 112 to spawn multiple secondary preview windows associated with the second project. To spawn a secondary preview window associated with the second project, the designer may select a button (e.g., a (+) button) on the interface 114a-n of the design application. Each time the designer selects the button, an additional secondary preview window may be spawned and displayed on the interface 114a-n. The designer may spawn as many secondary preview windows as he or she desires.

At 512, a third secondary preview window comprising a first copy of the second scene may be created in response to receiving third user input. For example, the third user input may be received when the when the designer (e.g., user) selects the button (e.g., a (+) button) on the interface 114a-n of the design application for a third time. At 514, a fourth window comprising a second copy of the second scene may be created in response to receiving fourth user input. For example, the third user input may be received when the when the designer (e.g., user) selects the button (e.g., a (+) button) on the interface 114a-n of the design application for a fourth time. The third secondary window and the fourth secondary window are configured to enable AB testing and comparison of different versions of the second visual effect in the second scene at an approximately same time.

Figure 6:
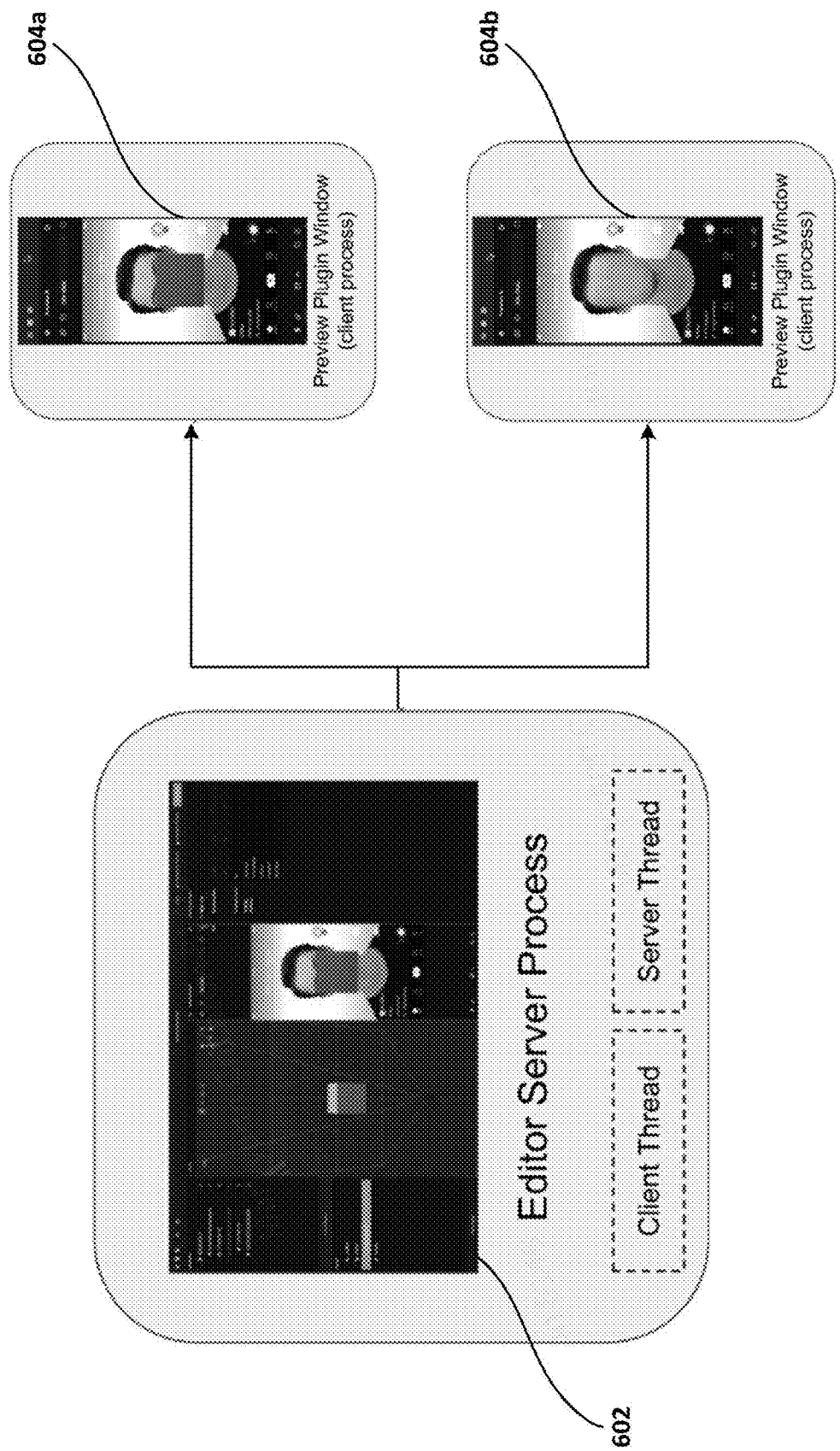
FIG. 6 shows multiple preview windows in accordance with the present disclosure.

FIG. 6 shows a main preview window 602 and multiple secondary preview windows 604a-b of an example user interface of a design application (e.g., design application 112) in accordance with the present disclosure. As described above, a designer may decide to work on a design project. For example, the designer may decide to work on the design of a visual effect. The client devices 110a-n may receive the project data (e.g., project data 130) associated with the desired project in response to sending a request for the project data associated with the project to the design service (e.g., design service 118). The client devices 110a-n may send the request for the project data associated with the project to the design service if the designer selects that project in the design application via the interface of the design application. The designer may select the project if the designer wants to start or continue work on the design of the effect associated with that project.

If the client devices 110a-n receive, from the design service, project data, the main preview window 602 of a scene comprising the effect may be displayed on the interface. As described above, the project data associated with the project may indicate the current design state of the effect associated with that project. Accordingly, the main preview window 602 provides a display or preview of what the effect would currently look like to a user 104a-n, based on the current design state of the effect. The designer can view the main preview window 602 to gain an understanding of how the effect would look if no more changes or modifications were made to the design of the effect.

In embodiments, the designers may test out various changes to the scene comprising the effect. For example, after the main preview window 602 of the scene comprising the effect is displayed, a designer may want to see the impact of various modifications or changes to the design of the effect. To do so, the designer can spawn multiple secondary preview windows 604a-b associated with the project. To spawn each secondary preview window 604a-b associated with the project, the designer may select a button (e.g., a (+) button) on the interface 114a-n of the design application. Each time the designer selects the button, an additional secondary preview window may be spawned and displayed. The designer may spawn as many secondary preview windows as he or she desires. The secondary windows 604a-b are configured to enable AB testing and comparison of different versions of the visual effect in the scene at an approximately same time.

Figure 7:
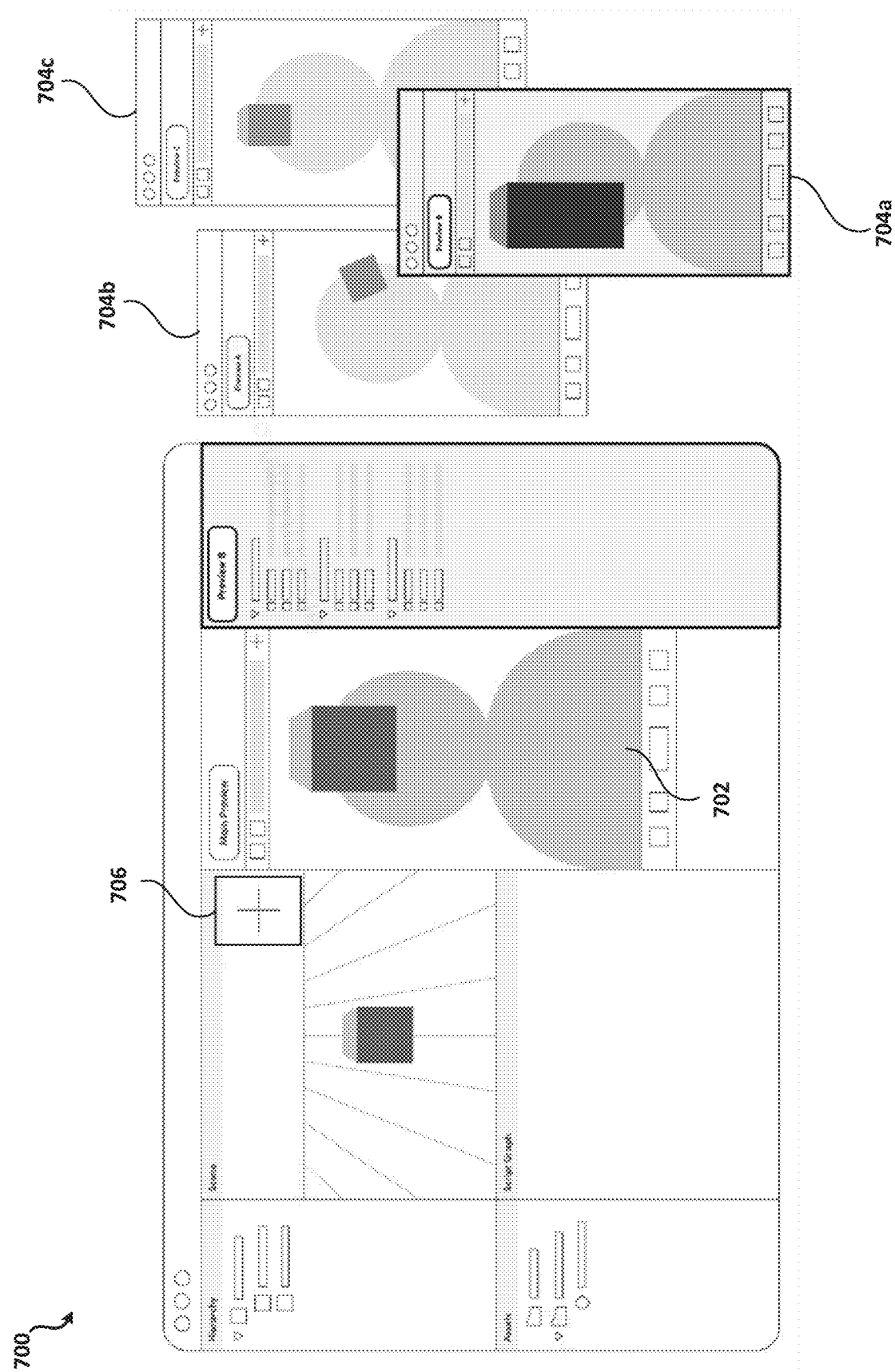
FIG. 7 shows an example user interface of a design application in accordance with the present disclosure.

FIG. 7 shows a main preview window 702 and multiple secondary preview windows 704a-c of an example user interface 700 of a design application (e.g., design application 112) in accordance with the present disclosure. As described above, a designer may decide to work on a design project. For example, the designer may decide to work on the design of a visual effect. The client devices 110a-n may receive the project data (e.g., project data 130) associated with the desired project in response to sending a request for the project data associated with the project to the design service (e.g., design service 118). The client devices 110a-n may send the request for the project data associated with the project to the design service if the designer selects that project in the design application via the interface of the design application. The designer may select the project if the designer wants to start or continue work on the design of the effect associated with that project.

If the client devices 110a-n receive, from the design service, project data, the main preview window 702 of a scene comprising the effect may be displayed on the interface. As described above, the project data associated with the project may indicate the current design state of the effect associated with that project. Accordingly, the main preview window 702 provides a display or preview of what the effect would currently look like to a user 104a-n, based on the current design state of the effect. The designer can view the main preview window 702 to gain an understanding of how the effect would look if no more changes or modifications were made to the design of the effect.

In embodiments, the designers may test out various changes to the scene comprising the effect. For example, after the main preview window 702 of the scene comprising the effect is displayed, a designer may want to see the impact of various modifications or changes to the design of the effect. To do so, the designer can spawn multiple secondary preview windows 704a-c associated with the project. To spawn each secondary preview window 704a-c associated with the project, the designer may select a button 706 (e.g., a (+) button) on the interface 114a-n of the design application. Each time the designer selects the button 706, an additional secondary preview window may be spawned and displayed. The designer may spawn as many secondary preview windows as he or she desires. The secondary windows 704a-c are configured to enable AB testing and comparison of different versions of the visual effect in the scene at an approximately same time.

Figure 8:
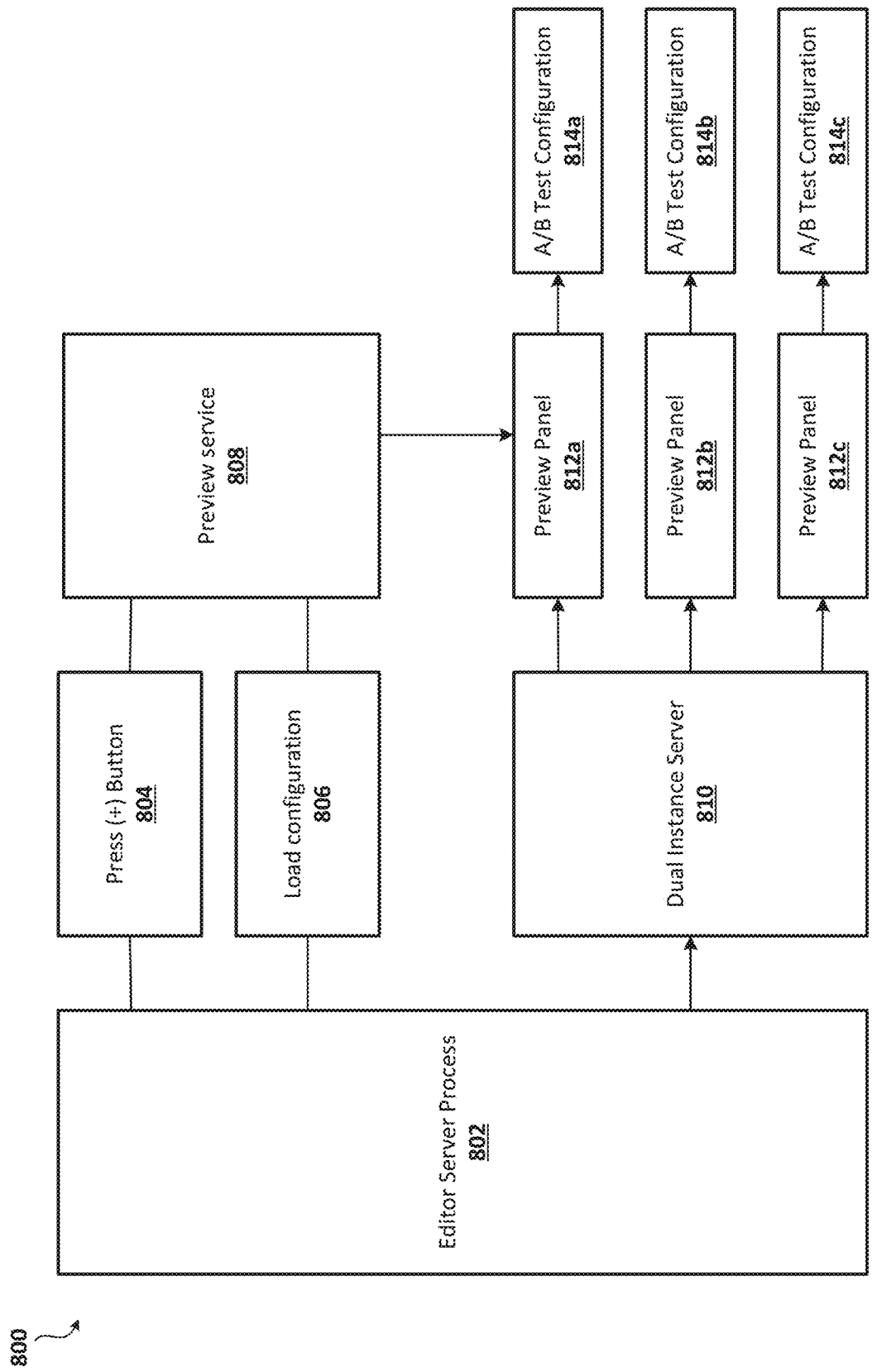
FIG. 8 shows an example flow diagram in accordance with the present disclosure.

FIG. 8 shows a flowchart 800 corresponding to the spawning of multiple secondary preview windows. A designer can use the following steps to utilize the multi-secondary window preview/AB testing Panel feature. A editor server process 802 may respond to a request for data associated with a project from a client computing device (e.g., the client devices 110). The request may be sent from the client computing device when a design associated with the client computing device presses the (+) button on an interface of a design application (e.g., the design application 112) at 804. In response to the request, the server process 802 may load the main configuration file associated with the project at 806 and initiate the multi-secondary window preview service at 808. For example, the editor server process 802 may determine that operations at 804 and 806 have been performed. If so, a preview service 808 may be initiated on the client device. The preview service 808 may spawn multiple secondary preview windows or panels 812a-c, each running on a new process. Each of the multiple secondary preview windows or panels 812a-c is associated with a locally saved AB testing configuration file 814a-c. A dual instance server 810 may facilitate the simultaneous display of the multiple secondary preview windows or panels 812a-c. Each instance on the dual instance server 810 has its own instance directory, database (for storing configuration files) and log directories.

Figure 9:
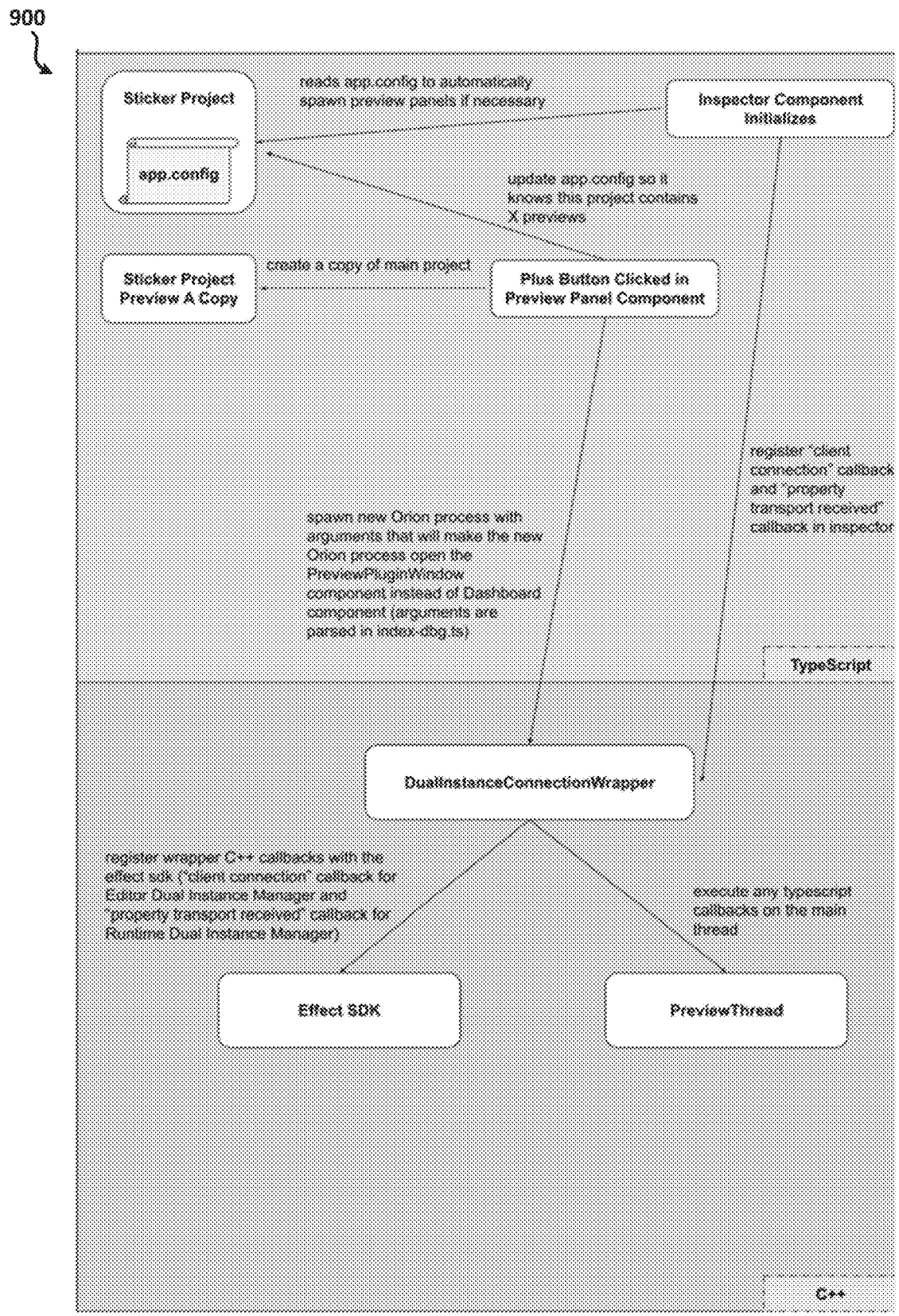
FIG. 9 shows another example flow diagram in accordance with the present disclosure.

FIG. 9 shows a flowchart 900 corresponding to the spawning of multiple secondary preview windows. An inspector component may be initialized on a client device 110a-n. By clicking a "plus" button, a designer can spawn a new secondary preview window running on a new process. Each process contains a copy of the main scene and specific property changes sent from the edit window through the inspector panel. A main configuration file (e.g., app.config file) present in the root of a project folder is utilized to keep track of how many previews a project contains. This allows the project to automatically spawn the preview processes. If a new secondary window is created, the main configuration file may be updated to reflect the accurate number of preview windows.

A main preview window may be displayed that renders an AR effect to a 2D texture. A designer can spawn multiple of these in new secondary preview windows, such as by clicking a button (e.g., (+) button). The user can also re-open their main project and all their previews will automatically appear with the changed properties. All of the preview windows may be open simultaneously. This is facilitating by the dual instance connection wrapper. A user may be able to configure the maximum number of previews windows.

The UI of the multiple preview windows may be designed with Typescript, and bindings to C++ code may be used to create a new Amazer instance to render a scene onto the preview panel. When the main editor (server process), makes changes to a scene, a socket message is sent to the Preview Plugin (client process) which will update the Preview Plugin's scene. Within the Preview Plugin (client process), specific changes to a scene can be made, but these changes will not appear on the main editor (server process), since the purpose of the Preview Plugin is to view what edits to properties of the original scene would look like. To keep track of clients, modifications may be made to the effect software development toolkit (SDK). For example, a map of clients is utilized and callbacks are invoked to tell the main editor when clients connect.

Figure 10:
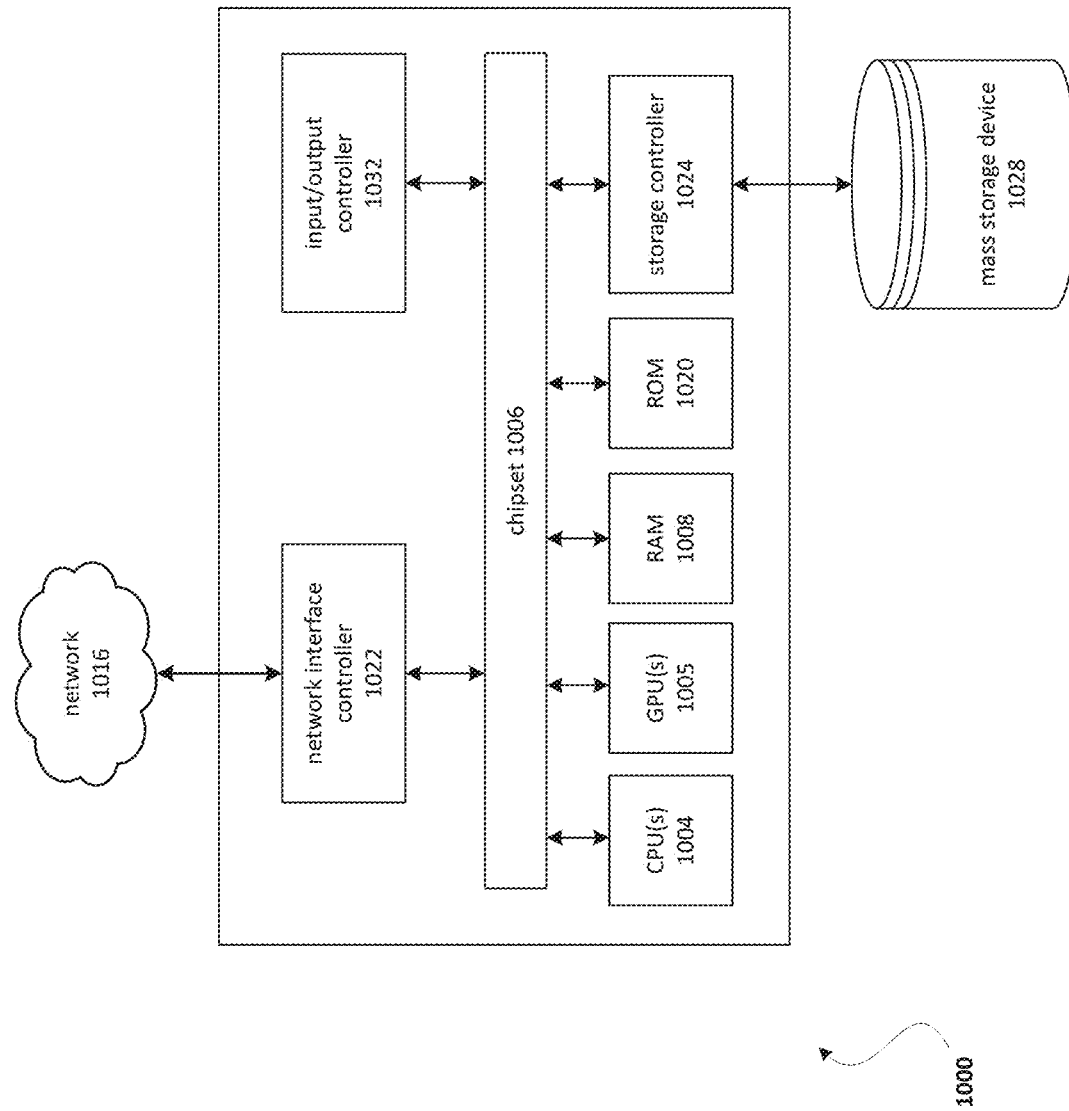
FIG. 10 shows an example computing device which may be used to perform any of the techniques disclosed herein.

FIG. 10 illustrates a computing device that may be used in various aspects, such as the services, networks, modules, and/or devices depicted in FIG. 1. With regard to the example architecture of FIG. 1, the cloud network (and any of its components), the client devices, and/or the network may each be implemented by one or more instance of a computing device 1000 of FIG. 10. The computer architecture shown in FIG. 10 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1000 may include a baseboard, or "motherboard," which is a printed circuit board to which a multitude of components or devices may be connected by way of a system bus or other electrical communication paths. One or more central processing units (CPUs) 1004 may operate in conjunction with a chipset 1006. The CPU(s) 1004 may be standard programmable processors that perform arithmetic and logical operations necessary for the operation of the computing device 1000.

The CPU(s) 1004 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1004 may be augmented with or replaced by other processing units, such as GPU(s). The GPU(s) may comprise processing units specialized for but not necessarily limited to highly parallel computations, such as graphics and other visualization-related processing.

A chipset 1006 may provide an interface between the CPU(s) 1004 and the remainder of the components and devices on the baseboard. The chipset 1006 may provide an interface to a random-access memory (RAM) 1008 used as the main memory in the computing device 1000. The chipset 1006 may further provide an interface to a computer-readable storage medium, such as a read-only memory (ROM) 1020 or non-volatile RAM (NVRAM) (not shown), for storing basic routines that may help to start up the computing device 1000 and to transfer information between the various components and devices. ROM 1020 or NVRAM may also store other software components necessary for the operation of the computing device 1000 in accordance with the aspects described herein.

The computing device 1000 may operate in a networked environment using logical connections to remote computing nodes and computer systems through local area network (LAN). The chipset 1006 may include functionality for providing network connectivity through a network interface controller (NIC) 1022, such as a gigabit Ethernet adapter. A NIC 1022 may be capable of connecting the computing device 1000 to other computing nodes over a network 1016. It should be appreciated that multiple NICs 1022 may be present in the computing device 1000, connecting the computing device to other types of networks and remote computer systems.

The computing device 1000 may be connected to a mass storage device 1028 that provides non-volatile storage for the computer. The mass storage device 1028 may store system programs, application programs, other program modules, and data, which have been described in greater detail herein. The mass storage device 1028 may be connected to the computing device 1000 through a storage controller 1024 connected to the chipset 1006. The mass storage device 1028 may consist of one or more physical storage units. The mass storage device 1028 may comprise a management component 1010. A storage controller 1024 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1000 may store data on the mass storage device 1028 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1028 is characterized as primary or secondary storage and the like.

For example, the computing device 1000 may store information to the mass storage device 1028 by issuing instructions through a storage controller 1024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1000 may further read information from the mass storage device 1028 by detecting the physical states or characteristics of one or more particular locations within the physical storage units.

In addition to the mass storage device 1028 described above, the computing device 1000 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1000.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1028 depicted in FIG. 10, may store an operating system utilized to control the operation of the computing device 1000. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1028 may store other system or application programs and data utilized by the computing device 1000.

The mass storage device 1028 or other computer-readable storage media may also be encoded with computer-executable instructions, which, when loaded into the computing device 1000, transforms the computing device from a general-purpose computing system into a special-purpose computer capable of implementing the aspects described herein. These computer-executable instructions transform the computing device 1000 by specifying how the CPU(s) 1004 transition between states, as described above. The computing device 1000 may have access to computer-readable storage media storing computer-executable instructions, which, when executed by the computing device 1000, may perform the methods described herein.

A computing device, such as the computing device 1000 depicted in FIG. 10, may also include an input/output controller 1032 for receiving and processing input from a number of input devices, such as a keyboard, a mouse, a touchpad, a touch screen, an electronic stylus, or other type of input device. Similarly, an input/output controller 1032 may provide output to a display, such as a computer monitor, a flat-panel display, a digital projector, a printer, a plotter, or other type of output device. It will be appreciated that the computing device 1000 may not include all of the components shown in FIG. 10, may include other components that are not explicitly shown in FIG. 10, or may utilize an architecture completely different than that shown in FIG. 10.

As described herein, a computing device may be a physical computing device, such as the computing device 1000 of FIG. 10. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A computing device, comprising:
   at least one processor; and
   at least one memory comprising computer-readable instructions that upon execution by the at least one processor cause the computing device to perform operations comprising:
   creating a first window comprising a first copy of a first scene in response to receiving first user input, wherein the first scene comprises a representation of a three dimensional (3D) space, wherein the first scene is associated with a first project, and wherein the first copy of the first scene comprises a first version of a first visual effect applied to the first scene;
   creating a second window comprising a second copy of the first scene in response to receiving second user input, wherein the second copy of the first scene comprises a second version of the first visual effect applied to the first scene, wherein the first window and the second window are presented concurrently, and wherein the first window and the second window are configured to enable testing and comparison of the different versions of the first visual effect in the same first scene at an approximately same time;
   modifying, via the first window, the first copy of the same first scene in the first window based on a first change to at least one attribute of the first version of the first visual effect in the first copy of the same first scene; and
   modifying, via the second window, the second copy of the same first scene in the second window based on a second change to at least one attribute of the second version of the first visual effect in the second copy of the same first scene, wherein the first change is different from the second change;

storing the modified first copy of the first scene to a first configuration file in the at least one memory, wherein the first configuration file is associated with the first window; and storing the modified second copy of the first scene to a second configuration file in the at least one memory, wherein the second configuration file is associated with the second window.

2. The computing device of claim 1, the operations further comprising:

in response to receiving user input indicative of accessing the first project, displaying the first window based on loading the modified first copy of the first scene from the first configuration file and displaying the second window based on loading the modified second copy of the first scene from the second configuration file.

3. The computing device of claim 2, the operations further comprising:

adjusting the modified first copy of the first scene based on another change to the at least one attribute of the first version of the first visual effect in the modified first copy of the first scene; and adjusting the modified second copy of the first scene based on another change to the at least one attribute of the second version of the first visual effect in the modified second copy of the first scene.

4. The computing device of claim 1, wherein before creating the first window and the second window, the operations further comprise:

receiving data indicative of the first scene from a server computing device.

5. The computing device of claim 4, the operations further comprising:

receiving information indicative of an update to the first scene from the server computing device; and updating the first copy of the first scene in the first window and updating the second copy of the first scene in the second window based on the received information.

6. The computing device of claim 1, the operations further comprising:

receiving data indicative of a second scene from a server computing device, wherein the second scene is associated with a second project, and the second scene comprise a second visual effect;

creating a third window comprising a first copy of the second scene in response to receiving third user input;

creating a fourth window comprising a second copy of the second scene in response to receiving fourth user input; and wherein different changes are made to the first copy of the second scene and the second copy of the second scene and stored to a third configuration file and a fourth configuration file, respectively, and wherein the third configuration file and the fourth configuration file are stored in the at least one memory of the computing device.

7. The computing device of claim 1, wherein the first visual effect comprises rendering an augmented reality (AR) effect on one or more images.

8. A method, comprising:

creating a first window comprising a first copy of a first scene in response to receiving first user input, wherein the first scene comprises a representation of a three dimensional (3D) space, wherein the first scene is associated with a first project, and wherein the first copy of the first scene comprises a first version of a first visual effect applied to the first scene;

creating a second window comprising a second copy of the first scene in response to receiving second user input, wherein the second copy of the first scene comprises a second version of the first visual effect applied to the first scene, wherein the first window and the second window are presented concurrently, and wherein the first window and the second window are configured to enable testing and comparison of the different versions of the first visual effect in the same first scene at an approximately same time;

modifying, via the first window, the first copy of the same first scene in the first window based on a first change to at least one attribute of the first version of the first visual effect in the first copy of the same first scene; and modifying, via the second window, the second copy of the same first scene in the second window based on a second change to at least one attribute of the second version of the first visual effect in the second copy of the same first scene, wherein the first change is different from the second change;

storing the modified first copy of the first scene to a first configuration file in the at least one memory, wherein the first configuration file is associated with the first window; and storing the modified second copy of the first scene to a second configuration file in the at least one memory, wherein the second configuration file is associated with the second window.

9. The method of claim 8, further comprising:

in response to receiving user input indicative of accessing the first project, displaying the first window based on loading the modified first copy of the first scene from the first configuration file and displaying the second window based on loading the modified second copy of the first scene from the second configuration file.

10. The method of claim 9, further comprising:

adjusting the modified first copy of the first scene based on another change to the at least one attribute of the first version of the first visual effect in the modified first copy of the first scene; and adjusting the modified second copy of the first scene based on another change to the at least one attribute of the second version of the first visual effect in the modified second copy of the first scene.

11. The method of claim 8, further comprising, before creating the first window and the second window:

receiving data indicative of the first scene from a server computing device.

12. The method of claim 11, further comprising:

receiving information indicative of an update to the first scene from the server computing device; and updating the first copy of the first scene in the first window and updating the second copy of the first scene in the second window based on the received information.

13. A non-transitory computer-readable storage medium, storing computer-readable instructions that upon execution by a processor cause the processor to implement operations, the operation comprising:

creating a first window comprising a first copy of a first scene in response to receiving first user input, wherein the first scene comprises a representation of a three dimensional (3D) space, wherein the first scene is associated with a first project, and wherein the first copy of the first scene comprises a first version of a first visual effect applied to the first scene;

creating a second window comprising a second copy of the first scene in response to receiving second user input, wherein the second copy of the first scene comprises a second version of the first visual effect applied to the first scene, wherein the first window and the second window are presented concurrently, and wherein the first window and the second window are configured to enable testing and comparison of the different versions of the first visual effect in the same first scene at an approximately same time;

modifying, via the first window, the first copy of the same first scene in the first window based on a first change to at least one attribute of the first version of the first visual effect in the first copy of the same first scene; and modifying, via the second window, the second copy of the same first scene in the second window based on a second change to at least one attribute of the second version of the first visual effect in the second copy of the same first scene, wherein the first change is different from the second change;

storing the modified first copy of the first scene to a first configuration file in the at least one memory, wherein the first configuration file is associated with the first window; and storing the modified second copy of the first scene to a second configuration file in the at least one memory, wherein the second configuration file is associated with the second window.

14. The non-transitory computer-readable storage medium of claim 13, the operations further comprising:

in response to receiving user input indicative of accessing the first project, displaying the first window based on loading the modified first copy of the first scene from the first configuration file and displaying the second window based on loading the modified second copy of the first scene from the second configuration file.

15. The non-transitory computer-readable storage medium of claim 14, the operations further comprising:

adjusting the modified first copy of the first scene based on another change to the at least one attribute of the first version of the first visual effect in the modified first copy of the first scene; and adjusting the modified second copy of the first scene based on another change to the at least one attribute of the second version of the first visual effect in the modified second copy of the first scene.

16. The non-transitory computer-readable storage medium of claim 13, the operations further comprising, before creating the first window and the second window:

receiving data indicative of the first scene from a server computing device.

17. The non-transitory computer-readable storage medium of claim 16, the operations further comprising:

receiving information indicative of an update to the first scene from the server computing device; and updating the first copy of the first scene in the first window and updating the second copy of the first scene in the second window based on the received information.

18. The computing device of claim 1, wherein the first scene comprises a game engine scene for use in a video game.

19. The method of claim 8, wherein the first scene comprises a game engine scene for use in a video game.

20. The non-transitory computer-readable storage medium of claim 13, wherein the first scene comprises a frame for a video.

\* \* \* \* \*